United States Patent
Magi et al.

(10) Patent No.: US 9,384,577 B2
(45) Date of Patent: Jul. 5, 2016

(54) EXTERNAL VISION AND/OR WEAPON AIMING SYSTEM FOR MILITARY LAND VEHICLES AND MILITARY NAVAL UNITS

(71) Applicant: SELEX ES S.p.A., Rome (IT)

(72) Inventors: Andrea Magi, Rome (IT); Federico Natali, Rome (IT)

(73) Assignee: SELEX ES S.P.A. (IT)

( * ) Notice: Subject to any disclaimer, the term of this patent is extended or adjusted under 35 U.S.C. 154(b) by 0 days.

(21) Appl. No.: 14/434,184

(22) PCT Filed: Oct. 16, 2013

(86) PCT No.: PCT/IB2013/059405
§ 371 (c)(1),
(2) Date: Apr. 8, 2015

(87) PCT Pub. No.: WO2014/060972
PCT Pub. Date: Apr. 24, 2014

(65) Prior Publication Data
US 2015/0235400 A1    Aug. 20, 2015

(30) Foreign Application Priority Data
Oct. 16, 2012 (IT) ............... TO2012A0907

(51) Int. Cl.
*G06T 11/60* (2006.01)
*F41G 3/22* (2006.01)
*G06T 5/00* (2006.01)
(Continued)

(52) U.S. Cl.
CPC . *G06T 11/60* (2013.01); *F41G 3/22* (2013.01); *G06T 5/009* (2013.01); *G06T 5/50* (2013.01);
(Continued)

(58) Field of Classification Search
CPC ........... G06T 11/60; G06T 5/009; G06T 5/50; G06T 2207/30252; G06T 2207/10048; G06T 2207/20036; G06T 2207/20208; G06T 2207/20221; G06T 2207/30212; G06T 2207/10016; H04N 7/181; F41G 3/22

USPC ......................................................... 348/148
See application file for complete search history.

(56) References Cited

U.S. PATENT DOCUMENTS

| 8,553,935 B2 * | 10/2013 | Mandella ............... G01B 21/04 179/18.09 |
| 2004/0100567 A1 * | 5/2004 | Miller ................ G02B 27/0093 348/239 |

(Continued)

FOREIGN PATENT DOCUMENTS

| DE | 3342338 | 9/1985 |
| DE | 4207251 | 9/1993 |

OTHER PUBLICATIONS

Corresponding International Search Report and Written Opinion for PCT/IB2013/059405 date Feb. 14, 2014.

*Primary Examiner* — Christopher S Kelley
*Assistant Examiner* — Zhihan Zhou
(74) *Attorney, Agent, or Firm* — The Belles Group, P.C.

(57) ABSTRACT

The invention regards an external vision and/or weapon aiming system for a military land vehicle and/or a military naval unit. The system comprises: two sensors configured to capture video streams of a same external scene, each in a respective spectral band; an electronic processing unit configured to insert a respective aiming reticle in the images of each captured video stream, thereby generating a corresponding pre-processed video stream, and to process the two pre-processed video streams; and a user interface configured to display a video stream received from the electronic processing unit. The system is characterized in that the electronic processing unit is configured to process the two pre-processed video streams by means of image enhancement and picture-in-picture functionalities, thereby generating first and second enhanced video streams.

10 Claims, 2 Drawing Sheets

(51) Int. Cl.
*G06T 5/50* (2006.01)
*H04N 7/18* (2006.01)

(52) U.S. Cl.
CPC ...... *H04N 7/181* (2013.01); *G06T 2207/10016* (2013.01); *G06T 2207/10048* (2013.01); *G06T 2207/20036* (2013.01); *G06T 2207/20208* (2013.01); *G06T 2207/20221* (2013.01); *G06T 2207/30212* (2013.01); *G06T 2207/30252* (2013.01)

(56) References Cited

U.S. PATENT DOCUMENTS

| 2009/0195652 A1* | 8/2009 | Gal | ........................ B60R 1/800 348/148 |
| 2009/0290019 A1 | 11/2009 | McNelis et al. | |
| 2011/0249086 A1* | 10/2011 | Guo | ........................ H04N 7/147 348/14.12 |

* cited by examiner

EXTERNAL VISION AND/OR WEAPON AIMING SYSTEM FOR MILITARY LAND VEHICLES AND MILITARY NAVAL UNITS

CROSS-REFERENCE TO RELATED PATENT APPLICATIONS

The present application is a U.S. national stage application under 35 U.S.C. §371 of PCT Application No. PCT/IB2013/059405, filed Oct. 16, 2013, which in turn claims priority to Italian Application No. TO2012A000907, filed Oct. 16, 2012, the entireties of which are incorporated herein by reference.

TECHNICAL FIELD OF INVENTION

The present invention relates to an external vision and/or weapon aiming system for military land vehicles such as, for example, armoured military vehicles, tanks, mine clearing vehicles, land vehicles equipped with weapons, etc., and for military naval units such as, for example, battle cruisers, patrol boats, corvettes, etc.

In this regard, for simplicity, the present invention will hereinafter be described only with reference to military land vehicles, but without any loss of generality. In fact, it is important to underline the fact that the external vision and/or weapon aiming system according to the present invention can be advantageously exploited on board military naval units as well, without having to make changes to the operation and architecture of said system.

STATE OF THE ART

As is known, nowadays, military land vehicles are generally equipped with external vision systems configured to capture video, or rather sequences of images, of the outside surroundings. For example, many military land vehicles are equipped with daytime vision systems configured to capture images of the outside surroundings in the visible spectral band (namely at wavelengths in the range between approximately 380/400 nm and 700/750 nm) and/or night-time vision systems configured to capture images of the outside surroundings in the infrared spectral band (namely at wavelengths in the range between approximately 0.7/0.75 µm and 1000 µm).

In general, an external vision system of a military land vehicle comprises:
one or more sensors installed on the outside of the military land vehicle, each sensor being configured to capture a respective video stream, or rather a respective sequence of images, of the surroundings outside the military land vehicle, for example, in the visible or infrared (IR) spectral band;
an electronic processing and control unit installed on board the military land vehicle, connected to the sensor(s) to receive the video stream(s) generated by said sensor(s) and configured to process said video stream(s) and to control the operation and aiming of the sensor(s); and
a user interface installed inside the crew compartment of the military land vehicle, connected to the processing and control unit and configured to display a video stream processed and provided by said processing and control unit.

In particular, the user interface conveniently comprises:
a screen configured to display a video stream processed and provided by the processing and control unit; and
user control means, for example, a control stick or joystick and/or a push-button panel (conveniently implemented on the edge of the screen or on a control panel separate from the screen), configured to enable a user to control, i.e. govern, the external vision system; for example, a user can control the aiming of the sensor(s) via said control stick/joystick.

As a rule, an aiming reticle is inserted by the electronic processing and control unit on the images of the video stream displayed by the user interface to indicate the aiming of the sensor that has generated said displayed video stream.

The user interface can be installed in various positions inside the crew compartment of the military vehicle, for example, in the commander's station of the military vehicle.

In the case of a military vehicle equipped with a weapon, an external vision system is conveniently associated with said weapon to enable a gunner to control aiming, in this way resulting in said external vision system also acting as an aiming system of said weapon. In this case, the user interface of the external vision and weapon aiming system could be conveniently installed inside the crew compartment of the military vehicle in the gunner's station.

In general, the screen of a user interface of a military vehicle's external vision system is quite small due to the limited space available on board the military vehicle, with the consequent risk of making potential threat detection and identification operations performed by an operator slower and more difficult.

Furthermore, the user interface of a military vehicle's external vision system does not normally allow easy and rapid switching between the different images supplied by the various sensors (for example, of the infrared and/or visible type).

Examples of known external vision and/or weapon aiming systems for military land vehicles and/or military naval units of the above-stated type are described in DE 33 42 338 A1, US 2009/195652 A1, US 2009/290019 A1 and DE 42 07 251 A1.

OBJECT AND SUMMARY OF THE INVENTION

In present-day military scenarios, it is increasingly important to know how to recognise and identify potentially hostile elements of interest in the shortest possible time. In particular, in the case of a military land vehicle or a military naval unit that operate in hostile surroundings, once a potential threat is detected, the time to recognise and identify it becomes crucial for the safety of said military vehicle/unit, even in an asymmetric threat scenario.

The applicant thus felt the need to carry out in-depth research in order to develop an innovative external vision and/or weapon aiming system for military land vehicles and military naval units able to provide, simultaneously and in the shortest possible time, various types of information generated by different types of sensors, and enable a user to make comparisons of the emissions generated by the elements of interest in the different spectral bands, in order to facilitate and speed up the operations of detection, recognition and identification of potential threats.

The object of the present invention is therefore that of providing an external vision and/or weapon aiming system for military land vehicles and military naval units of the above-stated type.

The above-stated object is achieved by the present invention insofar as it relates to an external vision and/or weapon aiming system for military land vehicles and military naval units, as defined in the appended claims.

In particular, the present invention concerns an external vision and/or weapon aiming system designed to be installed on board a military land vehicle and/or a military naval unit and comprising:

two sensors configured to capture video streams comprising images of a same scene outside the military vehicle or the military naval unit, each sensor being configured to capture a respective video stream in a respective spectral band;

an electronic processing unit connected to the two sensors to grab the two captured video streams and configured to insert a respective aiming reticle in the images of each grabbed video stream that indicates the aiming of the respective sensor that has captured said video stream, thereby generating a corresponding pre-processed video stream, and process the two pre-processed video streams; and a user interface connected to the electronic processing unit to receive the processed video streams and comprising a screen configured to display a video stream received from said electronic processing unit.

The external vision and/or weapon aiming system according to the present invention is characterized in that the electronic processing unit is configured to process the two pre-processed video streams by means of:

an image enhancement functionality, thereby generating two first enhanced video streams; and a picture-in-picture functionality, thereby generating two second enhanced video streams.

In particular, the electronic processing unit is configured to process each of the two pre-processed video streams by means of the image enhancement functionality processing each image of the pre-processed video stream under processing in the following manner:

zooming in on a first predefined portion of the image under processing of the pre-processed video stream under processing, thereby obtaining a first zoomed sub-image, said first predefined portion being centred on the aiming reticle of the image under processing;

applying a morphological image contrast enhancement algorithm to the first zoomed sub-image, thereby obtaining a morphological-image-contrast-enhanced zoomed image; and replacing, in the image under processing, a second predefined portion of said image under processing with the morphological-image-contrast-enhanced zoomed image and a third predefined portion of said image under processing with the first zoomed sub-image, thereby generating a corresponding image of the first enhanced video stream generated on the basis of the pre-processed video stream under processing; the positions occupied by the morphological-image-contrast-enhanced zoomed image and the first zoomed sub-image in said image of said first enhanced video stream being such as to not affect the viewing of a region imaged in correspondence to the aiming reticle.

Furthermore, the electronic processing unit is configured to process each of the two pre-processed video streams by means of the picture-in-picture functionality processing each image of the pre-processed video stream under processing in the following manner:

zooming in on a first predefined portion of the image under processing of the pre-processed video stream under processing, thereby obtaining a second zoomed sub-image, said first predefined portion being centred on the aiming reticle of the image under processing;

zooming in on a predefined portion of a given image of the other pre-processed video stream, thereby obtaining a third zoomed sub-image; said given image of the other pre-processed video stream being the image temporally corresponding to the image under processing of the pre-processed video stream under processing; said predefined portion of the given image of the other pre-processed video stream being centred on the aiming reticle of said given image; and replacing, in the image under processing, a second predefined portion of said image under processing with the second zoomed sub-image and a third predefined portion of said image under processing with the third zoomed sub-image, thereby obtaining a corresponding image of the second enhanced video stream generated on the basis of the pre-processed video stream under processing; the positions occupied by the second zoomed sub-image and the third zoomed sub-image in said image of said second enhanced video stream being such as to not affect the viewing of a region imaged in correspondence to the aiming reticle.

BRIEF DESCRIPTION OF DRAWINGS

For a better understanding of the present invention, some preferred embodiments, provided by way of non-limitative example, will now be described with reference to the attached drawings (not to scale), where.

DETAILED DESCRIPTION OF PREFERRED EMBODIMENTS OF THE INVENTION

The following description is provided to enable an expert in the field to embody and use the invention. Various modifications to the embodiments shown will be immediately obvious to experts and the generic principles described herein could be applied to other embodiments and applications without, however, leaving the scope of the present invention.

Thus, the present invention is not intended to be limited to just the embodiments set forth herein, but is to be accorded the widest scope consistent with the principles and features disclosed herein and defined in the appended claims.

With regard to this, as previously stated, for simplicity, the present invention will be described only with reference to military land vehicles, but without any loss of generality. In fact, it is important to underline the fact that the external vision and/or weapon aiming system according to the present invention can be advantageously exploited on board military naval units as well, without having to make changes to the operation and architecture of said system.

As previously described, some of the elements of interest present in the battlefield may not be easily recognisable or identifiable with the normal methods of image representation of current external vision systems.

Therefore, in order to facilitate identification and interpretation of difficult-to-identify elements of interest, the applicant has developed innovative image processing functionalities that enable enhancing the information present in correspondence to the aiming reticle by inserting the results of this processing directly in the images of the displayed video stream without compromising the viewing of the region imaged in correspondence to the aiming reticle.

In particular, the applicant has mainly developed two types of image processing functionality:
- an image enhancement functionality; and
- a picture-in-picture functionality.

The purpose of both of the above-stated types of functionality is therefore that of enhancing the type of view selected by the user (for example, in the visible or in the infrared spectral band) through the generation of enhanced sub-images (sub-frames) and the substitution of predetermined portions of the image of the original video stream with said enhanced sub-images.

In particular, the positions occupied by the enhanced sub-images in the images of the displayed video stream are such as to not affect the viewing of the region imaged in correspondence to the aiming reticle.

In detail, the enhanced sub-images are preferably placed in the bottom right-hand and bottom left-hand areas of the images of the displayed video stream.

Figure 1:
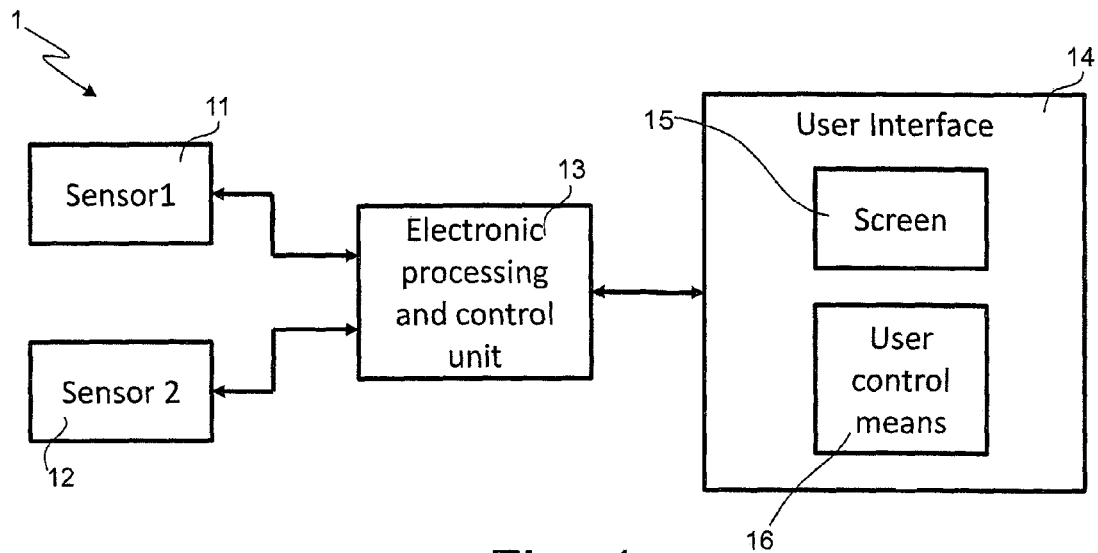
FIG. 1 schematically shows an example architecture of an external vision and/or weapon aiming system for military land vehicles and military naval units according to a preferred embodiment of the present invention.

In order to describe the present invention in greater detail, FIG. 1 shows a block diagram that represents an example architecture of an external vision and/or weapon aiming system (indicated as a whole by reference numeral 1) for military land vehicles according to a preferred embodiment of the present invention.

In particular, the external vision and/or weapon aiming system 1 comprises:
- a first sensor 11 installed on the outside of the military land vehicle (not shown in FIG. 1 for simplicity of illustration), for example a tank, and configured to capture a first video stream, or rather a first sequence of images, of the surroundings outside the military vehicle, preferably in the visible spectral band;
- a second sensor 12 installed on the outside of the military vehicle and configured to capture a second video stream, or rather a second sequence of images, of the surroundings outside the military vehicle, preferably in the infrared spectral band (IR); in particular, both sensors 11 and 12 are conveniently designed to be aimed so as to frame the same scenes of the surroundings outside of the military vehicle;
- an electronic processing and control unit 13 installed on board the military land vehicle, connected to both sensors 11 and 12 to receive, or grab, the video streams generated by them, and configured to
  - process said video streams generated by the sensors 11 and 12 by implementing the above-stated image enhancement and picture-in-picture functionalities so as to generate enhanced video streams, and
  - control the operation and aiming of said sensors 11 and 12; and
- a user interface 14 installed inside the crew compartment of the military vehicle, connected to the processing and control unit 13 and configured to display an enhanced video stream provided by the electronic processing and control unit 13.

In detail, the user interface 14 comprises:
- a screen 15 configured to display a enhanced video stream provided by the electronic processing and control unit 13; and
- user control means 16, for example push-buttons provided on the edges of the screen 15 or on a control panel separate from the screen 15, configured to enable a user to selectively activate the display, on the screen 15, of one of the enhanced video streams generated by the electronic processing and control unit 13.

Conveniently, the user control means 16 can also comprise:
- a control stick or joystick (not shown in FIG. 1 for simplicity of illustration) configured to enable a user to control the aiming of the sensors 11 and 12; and
- further push-buttons configured to enable a user to control the operation of the external vision and/or weapon aiming system 1; in particular, configured, when activated by a user, to send respective commands to the electronic processing and control unit 13.

The user interface 14 can be conveniently installed in various positions inside the crew compartment of a military vehicle, for example, in the commander's station of the military vehicle, or, in the case where the system 1 is operatively associated with a weapon of the military vehicle, and consequently acts as an external vision and aiming system for said weapon, in the gunner's station.

The electronic processing and control unit 13 is further configured to insert:
- a first aiming reticle in the images of the first video stream generated by the first sensor 11 that indicates the aiming of said first sensor 11, in particular said first aiming reticle being inserted in a central region of the images of the first video stream; and
- a second aiming reticle in the images of the second video stream generated by the second sensor 12 that indicates the aiming of said second sensor 12, in particular said second aiming reticle being inserted in a central region of the images of the second video stream.

In addition, said electronic processing and control unit 13 preferably comprises a field programmable gate array (FPGA) (not shown in FIG. 1 for simplicity of illustration) programmed, via opportune firmware code, to process the first video stream generated by the first sensor 11 and the second video stream generated by the second sensor 12 by implementing the above-stated image enhancement and picture-in-picture functionalities.

In particular, the FPGA is programmed to process the first video stream by means of the image enhancement functionality applying the following processing to each image of said first video stream:
- zooming in, or rather performing a digital zoom (2× for example), on a first predefined portion of the image under processing of the first video stream, thereby obtaining a zoomed sub-image, said first predefined portion being centred on the first aiming reticle;
- applying a morphological image contrast enhancement algorithm to the zoomed sub-image, thereby obtaining a morphological-image-contrast-enhanced zoomed image; and
- replacing, in the image under processing, a second predefined portion of said image under processing with the morphological-image-contrast-enhanced zoomed image and a third predefined portion of said image under processing with the zoomed sub-image, thereby obtaining a corresponding enhanced image; the positions occupied by the morphological-image-contrast-enhanced zoomed image and by the zoomed sub-image in the enhanced image being such as to not affect the viewing of the region imaged in correspondence to the first aiming reticle.

Thus, the FPGA generates a first enhanced video stream by processing the first video stream in the previously described manner, i.e. by means of the image enhancement functionality.

Then, if in use a user activates, via the user control means 16, the display of the first enhanced video stream, the screen 15 displays said first enhanced video stream generated by the electronic processing and control unit 13, in particular by the FPGA.

In addition, the FPGA is programmed to process the second video stream by means of the image enhancement functionality applying the following processing to each image of said second video stream:

- zooming in, or rather performing a digital zoom (2× for example), on a first predefined portion of the image under processing of the second video stream, thereby obtaining a zoomed sub-image, said first predefined portion being centred on the second aiming reticle;
- applying a morphological image contrast enhancement algorithm to the zoomed sub-image, thereby obtaining a morphological-image-contrast-enhanced zoomed image; and
- replacing, in the image under processing, a second predefined portion of said image under processing with the morphological-image-contrast-enhanced zoomed image and a third predefined portion of said image under processing with the zoomed sub-image, thereby obtaining a corresponding enhanced image; the positions occupied by the morphological-image-contrast-enhanced zoomed image and by the zoomed sub-image in the enhanced image being such as to not affect the viewing of the region imaged in correspondence to the second aiming reticle.

Thus, the FPGA generates a second enhanced video stream by processing the second video stream in the previously described manner, i.e. by means of the image enhancement functionality.

Then, if in use a user activates, via the user control means 16, the display of the second enhanced video stream, the screen 15 displays said second enhanced video stream generated by the electronic processing and control unit 13, in particular by the FPGA.

In addition, the FPGA is programmed to process the first video stream by means of the picture-in-picture functionality applying the following processing to each image of said first video stream:

- zooming in, or rather performing a digital zoom (2× for example), on a first predefined portion of the image under processing of the first video stream, thereby obtaining a first zoomed sub-image, said first predefined portion being centred on the first aiming reticle;
- zooming in, or rather performing a digital zoom (2× for example), on a predefined portion of an image of the second video stream temporally corresponding to the image under processing of the first video stream, thereby obtaining a second zoomed sub-image; said predefined portion of the image of the second video stream temporally corresponding to the image under processing of the first video stream being centred on the second aiming reticle and preferably having the same size as the first predefined portion of said image under processing; and
- replacing, in the image under processing, a second predefined portion of said image under processing with the first zoomed sub-image and a third predefined portion of said image under processing with the second zoomed sub-image, thereby obtaining a corresponding enhanced image; the positions occupied by the zoomed sub-images in the enhanced image being such as to not affect the viewing of the region imaged in correspondence to the first aiming reticle.

Thus, the FPGA generates a third enhanced video stream by processing the first video stream in the previously described manner, i.e. by means of the picture-in-picture functionality.

Then, if in use a user activates, via the user control means 16, the display of the third enhanced video stream, the screen 15 displays said third enhanced video stream generated by the electronic processing and control unit 13, in particular by the FPGA.

In addition, the FPGA is programmed to process the second video stream by means of the picture-in-picture functionality applying the following processing to each image of said second video stream:

- zooming in, or rather performing a digital zoom (2× for example), on a first predefined portion of the image under processing of the second video stream, thereby obtaining a first zoomed sub-image, said first predefined portion being centred on the second aiming reticle;
- zooming in, or rather performing a digital zoom (2× for example), on a predefined portion of an image of the first video stream temporally corresponding to the image under processing of the second video stream, thereby obtaining a second zoomed sub-image; said predefined portion of the image of the first video stream temporally corresponding to the image under processing of the second video stream being centred on the first aiming reticle and preferably having the same size as the first predefined portion of said image under processing; and
- replacing, in the image under processing, a second predefined portion of said image under processing with the first zoomed sub-image and a third predefined portion of said image under processing, with the second zoomed sub-image, thereby obtaining a corresponding enhanced image; the positions occupied by the zoomed sub-images in the enhanced image being such as to not affect the viewing of the region imaged in correspondence to the second aiming reticle.

Thus, the FPGA generates a fourth enhanced video stream by processing the second video stream in the previously described manner, i.e. by means of the picture-in-picture functionality.

Then, if in use a user activates, via the user control means 16, the display of the fourth enhanced video stream, the screen 15 displays said fourth enhanced video stream generated by the electronic processing and control unit 13, in particular by the FPGA.

Figure 2:
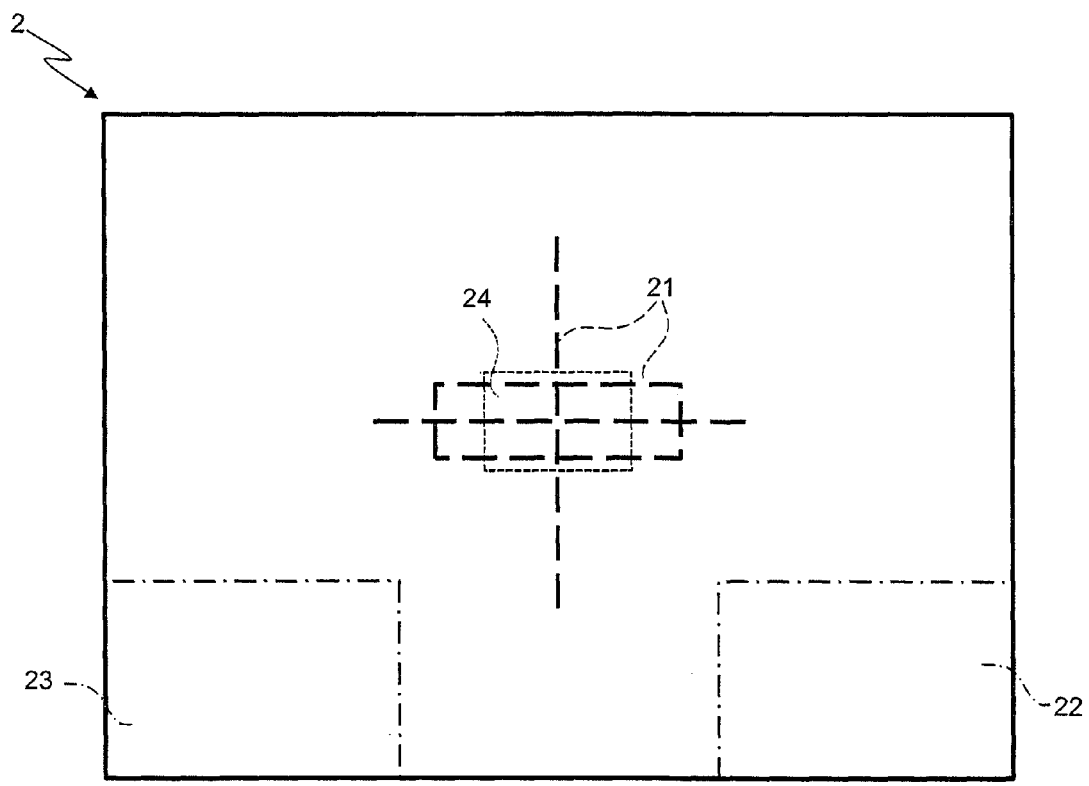
FIG. 2 schematically shows an example layout for images of four different types of enhanced video stream generated and displayed by the external vision and/or weapon aiming system in FIG. 1.

FIG. 2 schematically shows an example layout of the images of the four types of enhanced video stream generated by the electronic processing and control unit 13, in particular by the FPGA.

In particular, FIG. 2 shows an image (indicated as a whole by reference numeral 2) that comprises:

- an aiming reticle 21 (schematically represented by a dashed rectangle and a dashed cross) positioned in correspondence to a central region of said image 2;
- a first sub-image 22 (schematically represented by a first dot-dash rectangle) positioned in the bottom right-hand corner of said image 2; and
- a second sub-image 23 (schematically represented by a second dot-dash rectangle) positioned in the bottom left-hand corner of said image 2.

In the case where the image 2 is an image of the first or second enhanced video stream:
  the first sub-image 22 is the result of a 2× zoom of a portion 24 (schematically represented by a dashed rectangle) of said image 2 centred on the aiming reticle 21; and
  the second sub-image 23 is the result of applying the morphological image contrast enhancement algorithm to the first sub-image 22.

In the case where the image 2 is an image of the third enhanced video stream:
  the first sub-image 22 is the result of a 2× zoom of portion 24; and
  the second sub-image 23 is the result of a 2× zoom of a portion of an image of the second video stream temporally corresponding to the image 2; in particular, said portion of the image of the second video stream temporally corresponding to the image 2 is centred on the respective aiming reticle (i.e. the above-stated second aiming reticle) and has the same size as portion 24.

Lastly, in the case where the image 2 is an image of the fourth enhanced video stream:
  the first sub-image 22 is the result of a 2× zoom of portion 24; and
  the second sub-image 23 is the result of a 2× zoom of a portion of an image of the first video stream temporally corresponding to the image 2; in particular, said portion of the image of the first video stream temporally corresponding to the image 2 is centred on the respective aiming reticle (i.e. the above-stated first aiming reticle) and has the same size as portion 24.

Conveniently, portion 24 can, for example, comprise 120× 90 pixels and, in this case, the first sub-image 22 and the second sub-image 23 each comprise 240×180 pixels.

Thus, on the basis of the above description, it emerges that an important aspect of the present invention regards a new image layout to be shown to a user/operator of a military land vehicle (or also a military naval unit), applicable to weapon aiming and/or observation systems of an indirect type and capable of generating images in the visible and infrared (IR) spectrums.

In particular, the generated image layout is enhanced with respect to that originally generated by the sensors with sub-images containing information extracted from the source images and opportunely processed to facilitate and speed up the interpretation of the elements of interest.

The dominant part of the image that is subjected to zooming and processing following activation of the above-stated image enhancement and picture-in-picture functionalities is only that around the aiming reticle, so as not to block full-screen viewing of the scene and so enable better definition (easier aiming) and interpretation of an element of interest without compromising the surveillance and situational awareness of the entire scene being shot.

Furthermore, the arrangement of the sub-images is such as to not alter the presence of the standard NATO reticle and such as to allow the superimposition of a ballistic reticle for emergency firing.

In particular, the image layout after activation of the image enhancement functionality allows rapid comparison between the signature of an element of interest in a certain spectral band (IR or visible) and that deriving from different processing of the same spectral band without having to perform any video switchover and therefore enables immediate perception of elements not directly visible.

In addition, the image layout after activation of the picture-in-picture functionality allows rapid comparison between the IR signature and the visible signature of an element of interest without having to perform any video switchover and therefore without ever losing vision of the target in the two spectral bands.

The proposed image layout is displayable on practically any display unit currently in use on military land vehicles and on military naval units as it respects the intrinsic resolution of PAL/CCIR images.

Furthermore, the design decision to use a specific FPGA specially programmed via firmware to execute the above-stated image enhancement and picture-in-picture functionalities allows having a much higher computation speed with respect to the possible use of a processor programmed via software.

In fact, thanks to the use of a specific FPGA specially programmed via firmware to execute the above-stated image enhancement and picture-in-picture functionalities, the image latency of each part of the four video layouts shown herein (therefore, for both the dominant image part and the processed sub-images) with respect to the corresponding source video streams does not exceed 20 ms.

The morphological image contrast enhancement algorithm used in implementation of the image enhancement functionality is described in detail below.

In particular, said morphological image contrast enhancement algorithm is based on so-called mathematical morphology, which is a theory and mathematical technique for the analysis of geometrical structures usually employed in digital image processing. Mathematical morphology is based on non-linear filtering ,(minimum and maximum) applied by means of a moving window called a structuring element. The basic operations of mathematical morphology are erosion $\epsilon$ and dilation $\delta$.

In particular, with regard to the erosion operation, given a function f(x) and a structuring element B, the erosion $\epsilon$ of f by B at x is defined as the minimum value taken by f inside the window defined by B when B is centred on x, namely:

$$[\varepsilon_B(f)](x) = \min_{b \in B} f(x+b).$$

Furthermore, with regard to the dilation operation, given a function f(x) and a structuring element B, the dilation $\delta$ of f by B at x is defined as the maximum value taken by f inside the window defined by B when B is centred on x, namely:

$$[\delta_B(f)](x) = \max_{b \in B} f(x+b).$$

Figure 3:
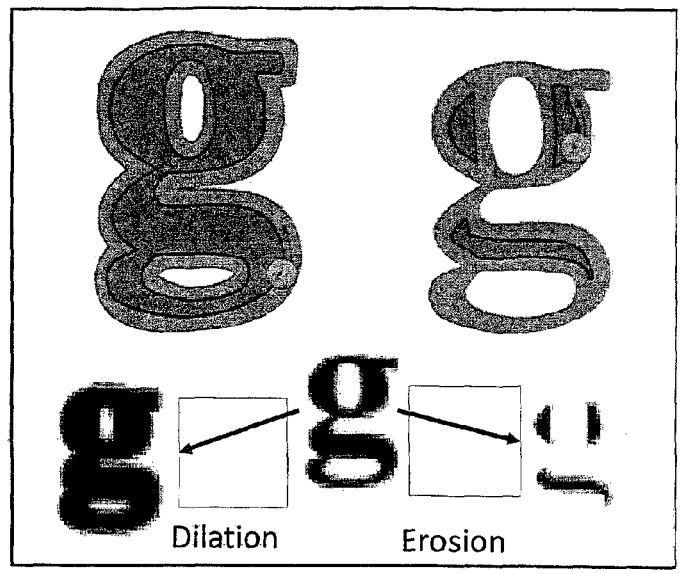
FIG. 3 schematically shows the effects of using an erosion operator and a dilation operator in the processing of an image.

The effects of the erosion and dilation operators are schematically shown in FIG. 3.

Moreover, the opening $\gamma$ and closing $\phi$ operators can be derived from the erosion and dilation operators.

In particular, with regard to the opening operation, the opening $\gamma$ of f by means of a structuring element B is defined as the operation of erosion $\epsilon$ of f by B followed by a dilation $\delta$ by B, namely:

$$\gamma_B(f) = \delta_B[\epsilon_B(f)].$$

In addition, with regard to the closing operation, the closing $\phi$ of f by means of a structuring element B is defined as the operation of dilation $\delta$ of f by B followed by an erosion $\epsilon$ by B, namely:

$$\phi_B(f) = \epsilon_B[\delta_B(f)].$$

The effect of the opening operation γ is that of cutting the peaks of the function f according to the size of the structuring element B. Inversely, the closing operation φ cuts the dips of the function f.

At this point, it is possible to define the white top-hat transform WTH and black top-hat transform BTH operations as follows:

$$WTH(f) = f - \gamma_B(f); \text{ and}$$

$$BTH(f) = \phi_B(f) - f.$$

The white top-hat transform WTH extracts the light details of the image that are smaller than the structuring element B; inversely, the black top-hat transform BTH extracts the dark details.

The idea underlying the morphological image contrast enhancement algorithm used in the implementation of the image enhancement functionality is that of recursively calculating the top-hat transforms of the zoomed sub-image with structuring elements of increasing size and up to three levels and to combine them with the original zoomed sub-image in the following manner:

$$I'(x, y) = I(x, y) + \frac{1}{2}\sum_{i=1}^{3} WTH_{iB}[I(x, y)] - \frac{1}{2}\sum_{i=1}^{3} BTH_{iB}[I(x, y)],$$

where I(x,y) indicates the intensity of the generic pixel considered (x,y) in the initial zoomed sub-image, B indicates a given structuring element, $WTH_{iB}$ and $BHT_{iB}$ respectively indicate the white top-hat transform and the black top-hat transform of the i'th order based on a structuring element iB, and I'(x,y) indicates the intensity of the generic pixel considered (x,y) in the morphological-image-contrast-enhanced zoomed image.

The summation operations on the white top-hat WTH and the black top-hat BTH transforms accumulate the light and dark details, respectively, of the zoomed sub-image. Summing and subtracting these light and dark details to/from the original zoomed sub-image results in passages from a light area to a dark one being amplified in width, thereby obtaining an increase in contrast on the edges of objects inside the sub-image, i.e. an increase in the morphological contrast of the sub-image.

Figure 4:
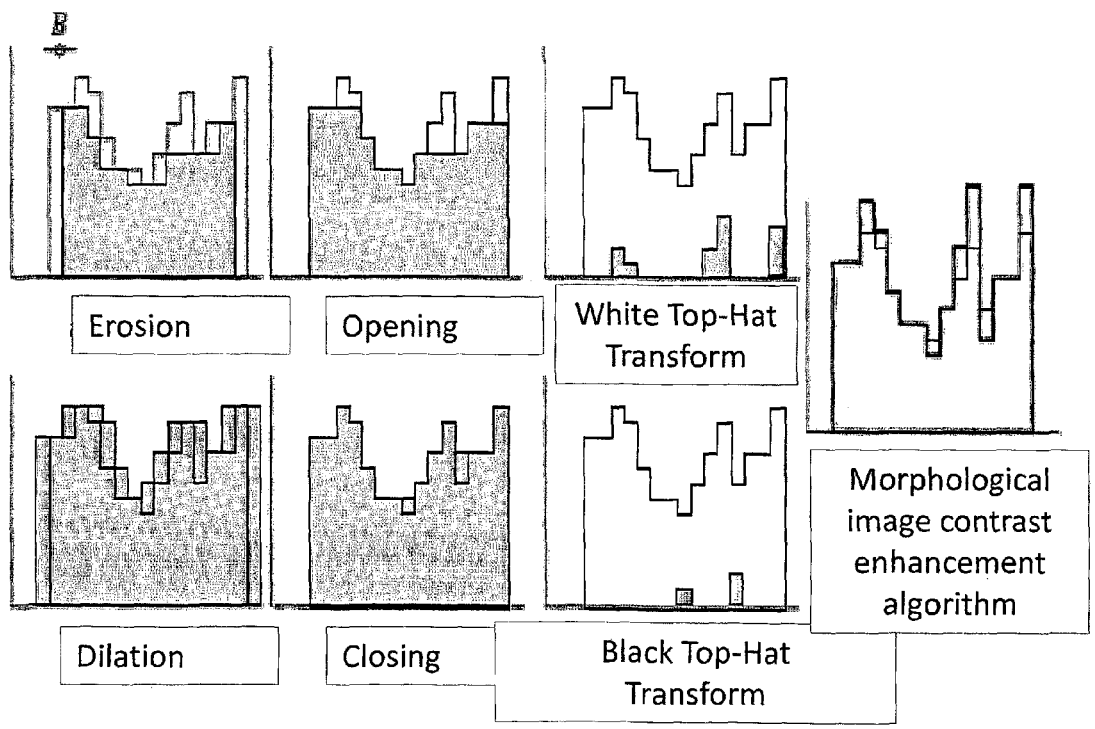
FIG. 4 schematically shows, in relation to the processing of an image, the effects obtained on the pixel intensity histogram of said image thanks to the use of erosion, dilation, opening and closing operators, white top-hat and black top-hat transforms and a morphological image contrast enhancement algorithm implemented by the external vision and/or weapon aiming system in FIG. 1.

The effects on the pixel intensity histogram of the erosion, dilation, opening and closing operators, the white top-hat and black top-hat transforms and the morphological image contrast enhancement algorithm used in the implementation of the image enhancement functionality are schematically shown in FIG. 4.

Apart from the advantages in terms of computational speed obtained thanks to the use of a specific FPGA specially programmed via firmware to execute the above-stated image enhancement and picture-in-picture functionality, use of the above-stated morphological image contrast enhancement algorithm also enables computational speed to be increased.

In fact, execution of the above-stated morphological image contrast enhancement algorithm by an FPGA has a moderate computational cost and, in consequence, enables processing the video streams very quickly. With regard to this, and as has already been described, thanks to the combined use of the above-stated morphological image contrast enhancement algorithm within the image enhancement functionality and a specific FPGA specially programmed via firmware to execute the above-stated image enhancement and picture-in-picture functionality, the image latency of each part of the four video layouts shown herein (therefore, for both the dominant image part and the processed sub-images) with respect to the corresponding source video streams video does not exceed 20 ms.

Therefore, with respect to other image enhancement techniques for the image to be shown to a user/operator, for example, the known so-called techniques of image fusion, the solution adopted by the present invention proves to be easier to apply and implement, without compromising effectiveness, as it requires far less hardware resources and less computing power.

In particular, with respect to processes of outright image fusion, the proposed method is devoid of the risk of losing details of the element of interest peculiar to one or the other spectral bands because of the mathematics of the data fusion algorithm.

Finally, it is clear that various modifications can be applied to the present invention without departing from the scope of the invention defined in the appended claims.

The invention claimed is:

1. An external vision and/or weapon aiming system designed to be installed on board a military land vehicle and/or a military naval unit, and comprising:
   two sensors configured to capture video streams comprising images of a same scene outside the military vehicle or the military naval unit, each sensor being configured to capture a respective video stream in a respective spectral band;
   an electronic processing unit connected to the two sensors
      to grab the two captured video streams and configured to
         insert a respective aiming reticle in the images of each grabbed video stream that indicates the aiming of the respective sensor that has captured said video stream, thereby generating a corresponding pre-processed video stream, and
      process the two pre-processed video streams; and
   a user interface connected to the electronic processing unit to receive the processed video streams and comprising a screen configured to display a video stream received from said electronic processing unit;
   wherein the electronic processing unit is configured to process the two pre-processed video streams by means of:
      an image enhancement functionality, thereby generating two first enhanced video streams; and
      a picture-in-picture functionality, thereby generating two second enhanced video streams;
   wherein the electronic processing unit is configured to process each of the two pre-processed video streams by means of the image enhancement functionality processing each image of the pre-processed video stream under processing in the following manner:
   zooming in on a first predefined portion of the image under processing of the pre-processed video stream under processing, thereby obtaining a first zoomed sub-image, said first predefined portion being centred on the aiming reticle of the image under processing;
   applying a morphological image contrast enhancement algorithm to the first zoomed sub-image, thereby obtaining a morphological-image-contrast-enhanced zoomed image; and
   replacing, in the image under processing, a second predefined portion of said image under processing with the morphological-image-contrast-enhanced zoomed image and a third predefined portion of said image under processing with the first zoomed sub-image, thereby generating a corresponding image of the first enhanced video stream generated on the basis of the pre-processed video stream under processing; the positions occupied by the morphological-image-contrast-enhanced zoomed image and the first zoomed sub-image in said image of said first enhanced video stream being such as to not affect the viewing of a region imaged in correspondence to the aiming reticle;

and wherein the electronic processing unit is configured to process each of the two pre-processed video streams by means of the picture-in-picture functionality processing each image of the pre-processed video stream under processing in the following manner:

zooming in on a first predefined portion of the image under processing of the pre-processed video stream under processing, thereby obtaining a second zoomed sub-image, said first predefined portion being centred on the aiming reticle of the image under processing;

zooming in on a predefined portion of a given image of the other pre-processed video stream, thereby obtaining a third zoomed sub-image; said given image of the other pre-processed video stream being the image temporally corresponding to the image under processing of the pre-processed video stream under processing; said predefined portion of the given image of the other pre-processed video stream being centred on the aiming reticle of said given image; and replacing, in the image under processing, a second predefined portion of said image under processing with the second zoomed sub-image and a third predefined portion of said image under processing with the third zoomed sub-image, thereby obtaining a corresponding image of the second enhanced video stream generated on the basis of the pre-processed video stream under processing; the positions occupied by the second zoomed sub-image and the third zoomed sub-image in said image of said second enhanced video stream being such as to not affect the viewing of a region imaged in correspondence to the aiming reticle.

2. The system of claim 1, wherein the electronic processing unit comprises a field programmable gate array programmed via firmware to process the two pre-processed video streams by means of:

the image enhancement functionality, thereby generating the two first enhanced video streams; and the picture-in-picture functionality, thereby generating the two second enhanced video streams.

3. The system of claim 2, wherein the field programmable gate array is programmed to apply the morphological image contrast enhancement algorithm to the first zoomed sub-image by performing the following mathematical morphology operations:

recursively calculating white top-hat and black top-hat transforms of said first zoomed sub-image using structuring elements of increasing size and up to three levels; and combining said first zoomed sub-image with the calculated white top-hat and black top-hat transforms, thereby generating the morphological-image-contrast-enhanced zoomed image.

4. The system according to claim 2, wherein the field programmable gate array is programmed to apply the morphological image contrast enhancement algorithm to the first zoomed sub-image by using the following formula:

$$I'(x, y) = I(x, y) + \frac{1}{2}\sum_{i=1}^{3} WTH_{iB}[I(x, y)] - \frac{1}{2}\sum_{i=1}^{3} BTH_{iB}[I(x, y)],$$

where
- x and y denote the position of a pixel under processing in the first zoomed sub-image;
- I(x,y) denotes the intensity of said pixel under processing in the first zoomed sub-image;
- B denotes a predetermined structuring element;
- $WTH_{iB}[I(x,y)]$ and $BHT_{iB}[I(x,y)]$ respectively denote a white top-hat transform and a black top-hat transform of the $i^{th}$ order applied to the intensity of said pixel under processing in the first zoomed sub-image and based on structuring element iB; and
- I'(x,y) denotes the intensity of a pixel corresponding to said pixel under processing in the morphological-image-contrast-enhanced zoomed image.

5. The system according to claim 1, wherein the sensors comprise:

a first sensor configured to capture a first video stream in the visible spectral band; and a second sensor configured to capture a second video stream in the infrared spectral band.

6. The system according to claim 1, wherein the user interface further comprises user control means configured to enable a user to selectively activate the display, on the screen, of one of the enhanced video streams generated by the electronic processing unit.

7. An electronic unit designed to be installed on board a military land vehicle and/or a military naval unit and to be connected to two sensors that are installed on board said military land vehicle and/or said military naval unit and are configured to capture video streams comprising images of a same scene outside said military land vehicle and/or said military naval unit, each sensor being configured to capture a respective video stream in a respective spectral band;

said electronic unit being configured to:

grab the video streams captured by the two sensors;

insert a respective aiming reticle in the images of each grabbed video stream that indicates the aiming of the respective sensor that has captured said video stream, thereby generating a corresponding pre-processed video stream;

wherein the electronic unit is further configured to process the two pre-processed video streams by means of:

an image enhancement functionality, thereby generating two first enhanced video streams; and a picture-in-picture functionality, thereby generating two second enhanced video streams;

said electronic unit being configured to process each of the two pre-processed video streams by means of the image enhancement functionality processing each image of the pre-processed video stream under processing in the following manner:

zooming in on a first predefined portion of the image under processing of the pre-processed video stream under processing, thereby obtaining a first zoomed sub-image, said first predefined portion being centred on the aiming reticle of the image under processing;

applying a morphological image contrast enhancement algorithm to the first zoomed sub-image, thereby obtaining a morphological-image-contrast-enhanced zoomed image; and replacing, in the image under processing, a second predefined portion of said image under processing with the morphological-image-contrast-enhanced zoomed image and a third predefined portion of said image under processing with the first zoomed sub-image, thereby generating a corresponding image of the first enhanced video stream generated on the basis of the pre-processed video stream under processing; the positions occupied by the morphological-image-contrast-enhanced zoomed image and the first zoomed sub-image in said image of said first enhanced video stream being such as to not affect the viewing of a region imaged in correspondence to the aiming reticle;

said electronic unit being configured to process each of the two pre-processed video streams by means of the picture-in-picture functionality processing each image of the pre-processed video stream under processing in the following manner:

zooming in on a first predefined portion of the image under processing of the pre-processed video stream under processing, thereby obtaining a second zoomed sub-image, said first predefined portion being centred on the aiming reticle of the image under processing;

zooming in on a predefined portion of a given image of the other pre-processed video stream, thereby obtaining a third zoomed sub-image; said given image of the other pre-processed video stream being the image temporally corresponding to the image under processing of the pre-processed video stream under processing; said predefined portion of the given image of the other pre-processed video stream being centred on the aiming reticle of said given image; and replacing, in the image under processing, a second predefined portion of said image under processing with the second zoomed sub-image and a third predefined portion of said image under processing with the third zoomed sub-image, thereby obtaining a corresponding image of the second enhanced video stream generated on the basis of the pre-processed video stream under processing; the positions occupied by the second zoomed sub-image and the third zoomed sub-image in said image of said second enhanced video stream being such as to not affect the viewing of a region imaged in correspondence to the aiming reticle.

8. A field programmable gate array designed to be embedded in an electronic unit designed to be installed on board a military land vehicle and/or a military naval unit and to be connected to two sensors that are installed on board said military land vehicle and/or said military naval unit and are configured to capture video streams comprising images of a same scene outside said military land vehicle and/or said military naval unit, each sensor being configured to capture a respective video stream in a respective spectral band;

wherein said electronic unit is configured to:
grab the video streams captured by the two sensors;
insert a respective aiming reticle in the images of each grabbed video stream that indicates the aiming of the respective sensor that has captured said video stream, thereby generating a corresponding pre-processed video stream;

said field programmable gate array being characterized in that it is programmed to process the two pre-processed video streams by means of:

an image enhancement functionality, thereby generating two first enhanced video streams; and a picture-in-picture functionality, thereby generating two second enhanced video streams;

said field programmable gate array being programmed to process each of the two pre-processed video streams by means of the image enhancement functionality processing each image of the pre-processed video stream under processing in the following manner:

zooming in on a first predefined portion of the image under processing of the pre-processed video stream under processing, thereby obtaining a first zoomed sub-image, said first predefined portion being centred on the aiming reticle of the image under processing;

applying a morphological image contrast enhancement algorithm to the first zoomed sub-image, thereby obtaining a morphological-image-contrast-enhanced zoomed image; and replacing, in the image under processing, a second predefined portion of said image under processing with the morphological-image-contrast-enhanced zoomed image and a third predefined portion of said image under processing with the first zoomed sub-image, thereby generating a corresponding image of the first enhanced video stream generated on the basis of the pre-processed video stream under processing; the positions occupied by the morphological-image-contrast-enhanced zoomed image and the first zoomed sub-image in said image of said first enhanced video stream being such as to not affect the viewing of a region imaged in correspondence to the aiming reticle;

said field programmable gate array being programmed to process each of the two pre-processed video streams by means of the picture-in-picture functionality processing each image of the pre-processed video stream under processing in the following manner:

zooming in on a first predefined portion of the image under processing of the pre-processed video stream under processing, thereby obtaining a second zoomed sub-image, said first predefined portion being centred on the aiming reticle of the image under processing;

zooming in on a predefined portion of a given image of the other pre-processed video stream, thereby obtaining a third zoomed sub-image; said given image of the other pre-processed video stream being the image temporally corresponding to the image under processing of the pre-processed video stream under processing; said predefined portion of the given image of the other pre-processed video stream being centred on the aiming reticle of said given image; and replacing, in the image under processing, a second predefined portion of said image under processing with the second zoomed sub-image and a third predefined portion of said image under processing with the third zoomed sub-image, thereby obtaining a corresponding image of the second enhanced video stream generated on the basis of the pre-processed video stream under processing; the positions occupied by the second zoomed sub-image and the third zoomed sub-image in said image of said second enhanced video stream being such as to not affect the viewing of a region imaged in correspondence to the aiming reticle.

9. A military land vehicle comprising the external vision and/or weapon aiming system claimed in claim 1.

10. A military naval unit comprising the external vision and/or weapon aiming system claimed in claim 1.

* * * * *